Figure 2:
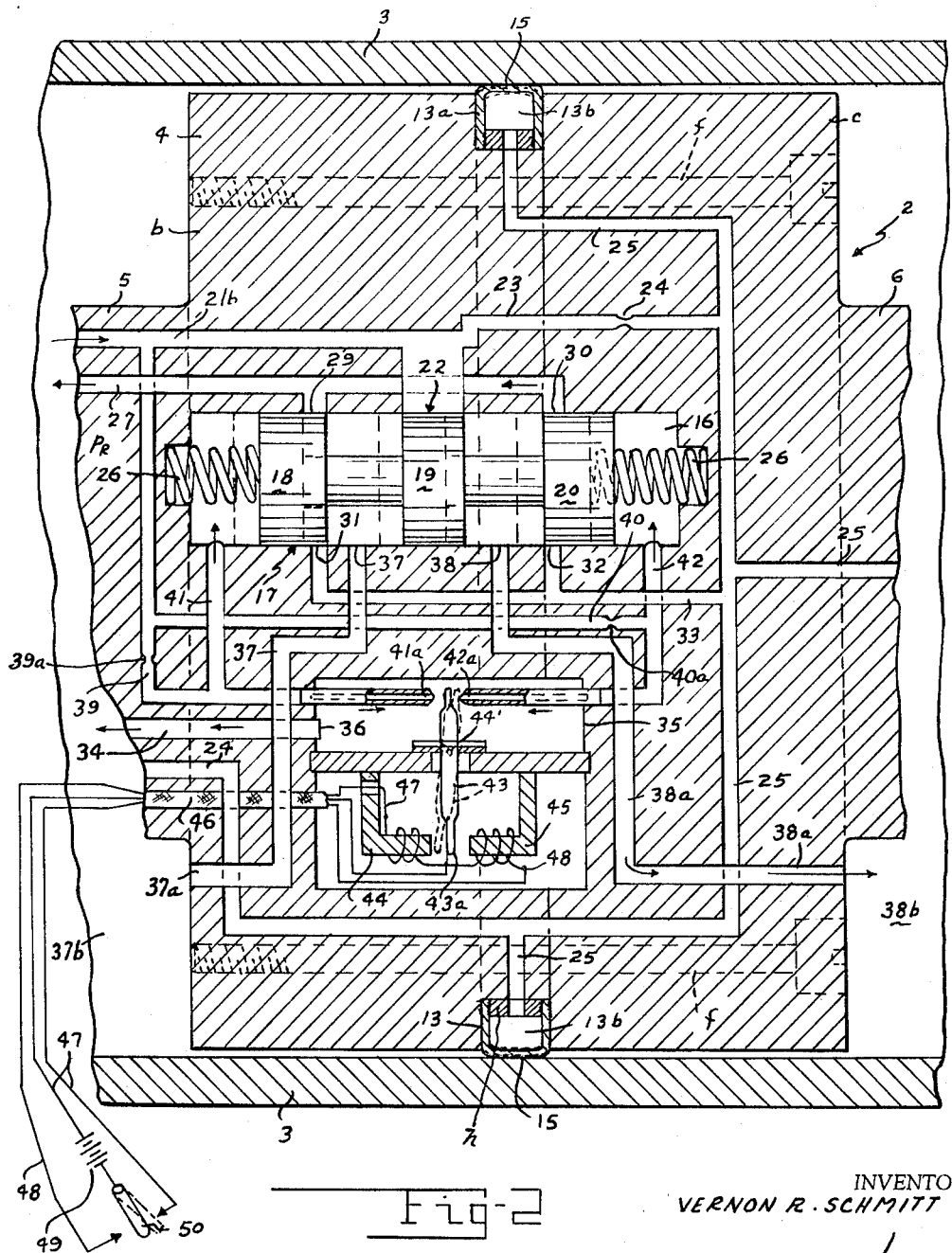

Aug. 9, 1966   V. R. SCHMITT   3,264,943
FLEXIBLE DYNAMIC SEAL
Filed July 8, 1964   2 Sheets-Sheet 1
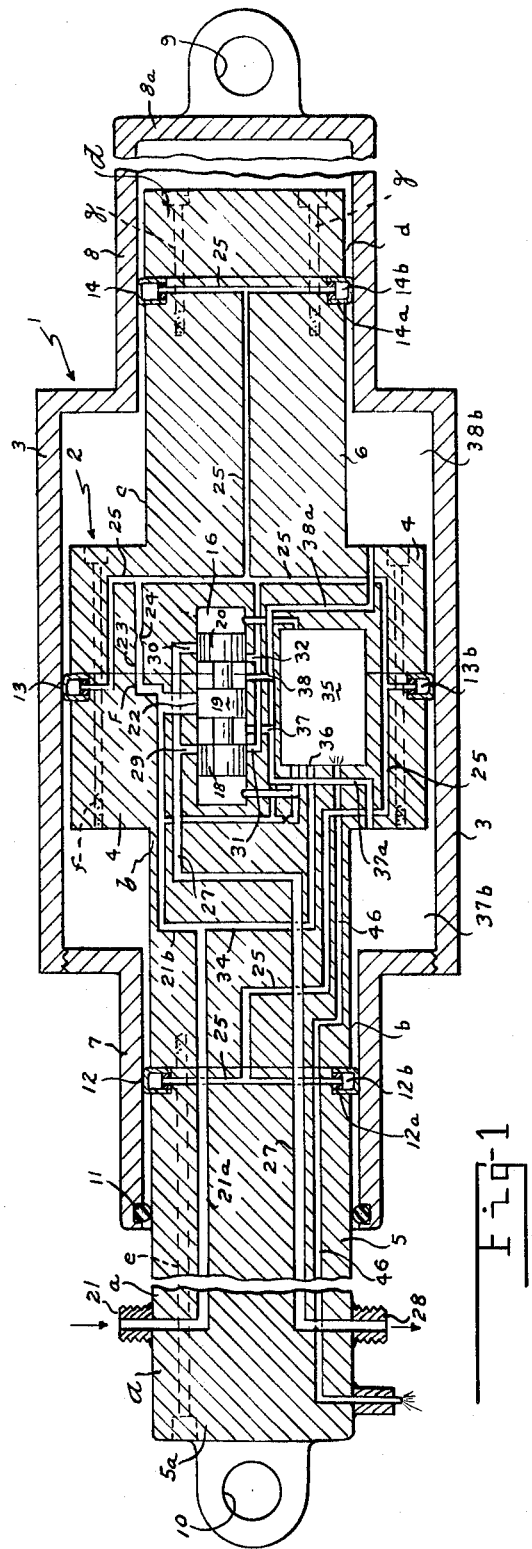
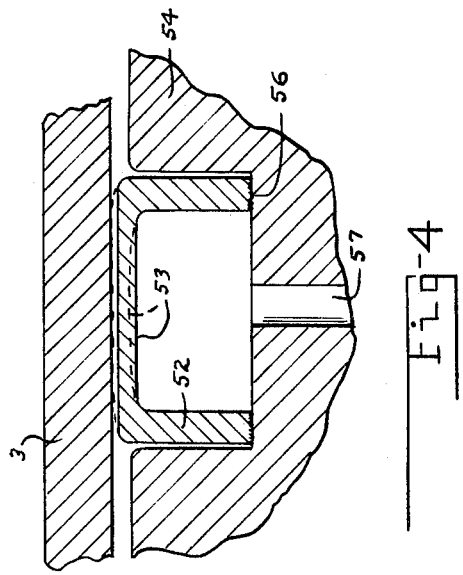
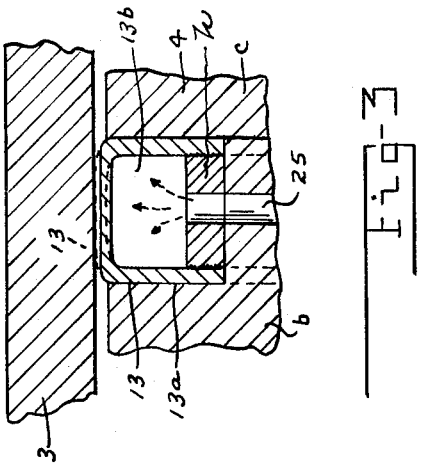
INVENTOR
VERNON R. SCHMITT
BY
ATTORNEYS 3,264,943
Patented August 9, 1966

1

3,264,943
FLEXIBLE DYNAMIC SEAL
Vernon R. Schmitt, 3970 Alkire Road, Grove City, Ohio
Filed July 8, 1964, Ser. No. 381,271
4 Claims. (Cl. 91—42)

The invention described herein may be manufactured and used by or for the United States Government for governmental purposes without payment to me of any royalty thereon.

This invention relates to pressure operated motors, such as power actuators, of the general types shown in my U.S. Patent No. 3,063,426, patented November 13, 1962, entitled "Piston Valve Actuator," and more particularly to piston ring seals therefor, having for an object the provision of annular piston ring seals which are pressure operated and expanded into tighter sealing engagement with the cylinder when the actuator is at rest, with means for automatically relieving the expansive pressure on the rings when the piston is actuated relatively in the cylinder in either axial direction.

A further object includes the provision of a servo control valve within the piston for controlling the movement and direction of movement of the piston relative to the cylinder and simultaneously controlling the expansion and retraction of the piston sealing rings during the actuation of the piston member in the cylinder.

A still further object is the provision of a power actuator comprising a cylinder and a piston which is reciprocable in the cylinder, in which a pressure expandible piston sealing ring is provided to prevent pressure or fluid leakage within the cylinder between the opposite ends thereof, including valve means having a neutral or null position for arresting relative movement between the piston and cylinder and simultaneously causing admission of a pressure medium behind the piston sealing ring to expand the same into tighter frictional and sealing contact with the inner wall of the cylinder, and movable to vent the pressure medium from behind the sealing ring to relieve the frictional contact between the sealing ring and the cylinder when the valve means is moved out of said null position to admit pressure into either end of the cylinder for moving the piston relatively therein.

A further object is the provision of an actuator having a piston member axially movable therein with an annular resilient metallic U-shaped piston ring surrounding the piston having an outer expandible periphery normally in light fluid sealing engagement with the inner wall of the cylinder to retard fluid leakage between the cylinder and the piston during axial movement between the piston and cylinder, and including a closed annular pressure chamber surrounding said piston behind said piston ring with shiftable valve means having a normal or null position normally connected for admitting a pressure medium into said pressure chamber for expanding said resilient piston ring into tighter frictional and fluid sealing contact with the inner wall of the cylinder when said piston is at rest therein, in which said valve means is shiftable from said normal position in one direction to vent said chamber to relieve said frictional contact between said ring and said cylinder and simultaneously admit pressure into one end of said cylinder for moving the piston relatively, axially in one direction therein, and said valve means is shiftable from said normal position in the opposite direction to vent said chamber to relieve said frictional contact between said ring and said cylinder and simultaneously admit pressure into the opposite end of said cylinder for moving said piston relatively axially in the opposite direction in the opposite direction in the cylinder.

2

A further object includes a servo motor valve carried within said piston having a normal or null position to cause the admission of a pressure medium behind said resilient annular piston ring for expanding the outer surface of the ring into tight friction and fluid sealing contact with the inner wall of the cylinder to retard free axial movement thereof and trap pressure fluid in the opposite ends of the cylinder, and means for moving said servo motor valve axially to selectively admit pressure into either end of the cylinder and vent the other end of the cylinder, for selectively moving said piston relative to the cylinder in which movement of said servo motor valve from said null position in either direction vents said pressure from behind said resilient piston ring to permit contraction thereof and reduction of the frictional and sealing pressure of said ring on the inner surface of said cylinder to permit freer movement of said piston within said cylinder, under control of said servo motor valve.

A further object includes means exteriorly of said piston for controlling the axial movement and direction of axial movement of said servo motor valve in said piston.

A further object includes metallic resilient annular U-shaped piston rings seated in annular channels formed in the periphery of the piston with the outer surface of the base of the U-shaped piston rings normally extending outwardly in very close sliding relation to the inner surface of the cylinder and the annular inwardly extending extremities of the U-shaped piston rings seated in the opposite sides of the annular channels in sealed relation therein to form annular pressure chambers in the piston behind the rings, in which the piston includes shiftable servo motor valve means therein having a normal null position controlling pressure conduit means connected in communication with said channels for admitting a pressure medium into said channels to expand the peripheral exposed portions of the piston rings into tighter sealing and frictional engagement with the inner surface of the cylinder, in which the valve means is shiftable from said null position to vent said channels and permit the resiliency of said U-shaped piston rings to retract the outer peripheral portions thereof to their aforesaid normal positions and simultaneously admit pressure into one end of the cylinder for moving the piston axially in said cylinder.

Other objects and advantages of the invention will become apparent from the following description and accompanying drawings in which like reference characters refer to like parts in the several figures in which:

FIG. 1 is a somewhat diagrammatic, longitudinal, sectional view through a piston and cylinder power actuator, incorporating the invention therein, portions broken away to foreshorten the length of the actuator as shown.

FIG. 2 is an enlarged, fragmentary, longitudinal, sectional view of the central portion of the actuator shown in FIG. 1, with the end portions of the cylinders and piston members broken away, and showing the invention including the servo motor control valve and the selective remote control means therefor, with the servo valve in its null position in full lines, and shifted to the left to one of its operative positions in dotted lines.

FIG. 3 is a further enlarged fragmentary, transverse, sectional view taken through one of the resilient metallic U-shaped piston rings or seals, showing one method of mounting and sealing the ring in the piston member to provide an annular pressure chamber or channel behind the ring. This view showing, somewhat exaggerated, the relation of the outer surface of the ring in its normal (maximum clearance) relation to the inner surface of the cylinder, and in dotted lines showing the outer surface of the U-shaped ring expanded radially, as by internal pressure in the channel, into tighter sealing and frictional contact with the inner surface of the cylinder.

FIG. 4 is a fragmentary, transverse, sectional view through a modified type of expandible piston ring and mounting.

In the drawings the reference numeral 1 denotes a closed cylinder, such as disclosed in my U.S. Patent No. 3,063,426, patented November 13, 1962, entitled "Piston Valve Actuator," in which a piston 2 is mounted for axial motion therein when pressure is admitted into one or the other ends of the cylinder.

The cylinder 1, as shown, has an enlarged central cylindrical portion 3 in which an enlarged central piston member 4 is mounted, the piston 1 having concentric reduced cylindrical piston extremities 5 and 6 which are received in the concentric reduced diameter cylindrical extremities 7 and 8. The outer end 8a of the cylindrical extremity 8 is provided with a suitable bracket or eye 9 to which one end of the actuator may be connected. The outer end 5a of the reduced piston or extension 5 also carries a bracket or eye 10 to which the other end of the actuator is or may be connected.

A conventional O-ring 11 is seated in a channel at the outer end of the reduced cylinder portion 7 in fluid sealing contact with the piston rod or extension 5 to prevent fluid leakage from within the actuator device.

Expansible resilient U-shaped metallic piston rings 12, 13, and 14 are seated and sealed in suitable annular channels 12a, 13a, and 14a to provide annular pressure chambers 12b, 13b, and 14b behind the respective U-shaped piston rings 12, 13 and 14 for receiving pressure for expanding the peripheries thereof from the positions substantially as shown in full lines in FIG. 3 to the dotted line position shown in that figure.

One method of mounting the expansible U-shaped piston rings in the channels in the periphery of the piston may be that of forming a composite piston, for instance, in four sections a, b, c, and d which can be secured or bolted together by fastenings e, f, and g and providing an annular rabbet in one end of, for instance, the sections a, b, and c, having the desired width and depth of the ring seal channels 12a, 13a, and 14a. The U-shaped annular rings or seals may each be fitted with an annular internal clamping ring h between the inner extremities of the side flanges of the rings, somewhat like spreaders. When the rings h are inserted in the rabbets and the sections a, b, c, and d are assembled and drawn tightly together the inner extremities of the U-shaped rings are securely clamped and sealed in the piston structure as seen in FIG. 3 to provide the annular pressure chambers 12b, 13b, and 14b behind the rings for outward or radial expansion of the intermediate resilient portions 15 of the rings into tighter sealing and frictional contact with the inner walls of the cylinder 1 when pressure is introduced into the chambers.

The servo motor and valve structure as shown follows substantially the same structure shown in my aforementioned patent, and is shown in enlarged detail in FIG. 2 adding the improved cooperating sealing rings.

A servo motor control valve chamber is indicated at 16 in which is reciprocably mounted a three-spool valve member 17 having the valve spools 18, 19 and 20, pressure being supplied or introduced at 21 through a pressure supply conduit 21a and 21b to a port 22 which is normally covered and closed by the center spool 19 of the spool valve 17 when the valve 17 is centralized or in its null position as shown in FIG. 1, and in full lines in FIG. 2.

The conduit 21b is provided with a conduit extension 23 having a flow retarding restriction 24 therein, the conduit 23 connecting the conduits 25 leading to the annular pressure chambers 12b, 13b, and 14b behind the respective U-shaped expansible annular metallic piston rings or seals 12, 13, and 14.

It will be noted that with the spool valve 17 in its null position as seen in FIG. 1 and in full lines in FIG. 2, closing the central port 22, that a pressure fluid entering at inlet 21 will pass through the conduits 21a and 21b, past the restriction 24 and through the conduits 25 and build up pressure in the annular chambers 12b, 13b and 14b behind the piston rings 12, 13, and 14, to expand the outer resilient peripheral portions 15 radially outwardly into sealing and frictional contact with the inner walls of the cylinder, as seen in dotted lines in FIG. 2, thus expanding the rings to frictionally resist movement of the piston in the cylinder as well as increase the resistance to leakage between the opposite ends of the cylinder when the piston is at rest (of course, with the spool valve 17 in its centered or null position).

Springs, as indicated at 26, may be provided to assist in centralizing the spool valve 17 to its null position, especially when no pressure is present in the pressure supply conduit 21b.

The piston is formed with a fluid return conduit 27 having an exterior outlet 28 adapted to be connected to the inlet side of a pressure pump, for instance, for supplying fluid under pressure to the pressure introducing inlet 21.

The fluid return conduit 27 is provided with spaced fluid ports 29 and 30 which are arranged to be covered and closed by the spools 18 and 20 of the twin spool valve 17 when the same is centralized in its null position as seen in full lines in FIG. 2.

Opposite the ports 29 and 30 are ports 31 and 32, respectively, also covered and closed by the spools 18 and 20 when the valve 17 is in its null position.

The ports 31 and 32 are connected by a conduit 33 which is connected in communication with the conduits 25 leading to the annular pressure chambers behind the expansible resilient piston rings or seals 12, 13, and 14. Since the ports 29, 31, and 32, 30 are normally closed (with the valve 17 in centralized null position) pressure in conduit 21b, 23 will pass through restrictions 24 and through conduits 25 to expand the piston rings or seals into frictional and sealing contact with the inner walls of the cylinder 1, thus frictionally retarding movement of the piston 2 in the cylinder 1 as well as preventing leakage around the piston.

However, movement of the spool valve 17 to the left (as shown in dotted lines in FIG. 2) uncovers one set of ports 29, 31, or movement of the valve 17 to the right uncovers the other set of ports 30, 32. In each case this establishes communication between the pressure chambers behind the rings, through the conduits 25 and the pressure relief or return conduit 27 and pressure will be vented and drop, allowing the resilient U-shaped piston rings to retract to their normal shape and reduce or eliminate their outward frictional pressure and fluid sealing relation with the walls of the cylinder. The restriction 24 in conduit 23 will provide the necessary pressure drop in conduits 25 when the ports 31 or 32 are connected through the valve 17 to the ports 29 or 30 to the return conduit 27 when the valve 17 is shifted axially, to permit the retraction of the outer peripheries 15 of the piston rings 12, 13, and 14 from the inner walls of the cylinder 1.

In the drawings the reference numeral 34 denotes a presure supply branch conduit leading from the conduit or passage 21a into the servo motor control valve chamber 35 at 36.

The servo motor cylinder or chamber 16 is provided with spaced fluid outlet and return ports 37 and 38 disposed between the spools 18 and 19, and 19 and 20, respectively, with the servo motor valve 17 in either null or shifted positions. The port 37 is connected by a conduit 37a to the space 37b between the piston portion 4 and the left hand wall of the enlarged cylinder portion 3 while the port 38 is connected by conduit 38a to the annular space 38b between the piston portion 4 and the right hand end of the enlarged cylinder portion 3.

From the above it will be noted that when the spool valve 17 is shifted axially in either direction to uncover the port 22 fluid under pressure from conduit 21b will pass between the spools 18 and 19, or between 19 and 20, and through the conduit 37a, or the conduit 38a, simultaneously with reduction in pressure in conduits 25 and resulting retraction of the piston rings 12, 13, and 14, and move the piston 2 axially in the cylinder 1 in either direction depending upon the direction of movement of the servo motor valve (spool valve) 17.

The conduits 39 and 40 have flow restrictions 39a and 40a therein for reducing the pressure drop across the nozzles 41a and 42a and flapper 43.

As seen more particularly in FIG. 2, a fluid pressure delivery conduit 41 leads from the left hand end of the cylinder 16 into the "flapper" valve chamber 35 and a pressure delivery conduit 42 leads from the right hand end of the cylinder 16 into the flapper valve chamber 35, the conduits 41 and 42 extending toward each other in the chamber 35 as shown, having opposite outlet ports disposed at opposite sides of a flapper valve 43.

The flapper valve 43 is pivoted at 44 to swing right or left to restrict or retard the fluid pressure outflow from either of the conduits 41 or 42. When the flapper valve 43 is midway between the outlet ends 41a and 42a pressure in the opposite ends of the cylinder 16 is equalized, centralizing (with the springs 26) the spool valve 17. However, when the flapper valve is moved closer to one of the ends 42a (as shown in dotted lines in FIG. 2) the pressure on the ends of the spool valve 17 is unbalanced and the spool valve 17 will move axially (for instance, as shown in dotted lines in FIG. 2) admitting pressure through port 22 into conduit 38a and move the piston 4 to the left. As mentioned above, the conduit 25 is simultaneously ported into pressure return conduit 27, permitting the piston rings or seals 12, 13, and 14, to contract as previously described, and shown in full lines in FIG. 3.

Any suitable means may be provided for swinging the flapper valve 43 to the right or left to control the complete and simultaneous operation of the piston valve actuator and its cooperating expensible piston rings. For instance, somewhat after the manner disclosed in my Patent 3,063,426, the lower end or tail 43a of the flapper valve lever may comprise an armature disposed between spaced electromagnets 44 and 45, suitable resilient or spring means may be provided for returning the flapper valve lever 43 to its mid position when the magnets are de-energized.

A suitable electrical conductor 46 provides two energizing circuits 47 and 48, having an electrical power source 49, controlled by suitable switch means 50. Of course, other means may be provided if desired, for shifting the spool valve 17 in its cylinder. The specific means for this purpose as shown in FIG. 2 being only for exemplary purposes.

From the above it will be observed that when the servo motor valve 17 is in its null position, the pressure from the conduit 21b, 23 and through conduits 25, presses the outer surface 15 of the piston rings or seals into frictional and sealing contact with the inner walls of the cylinder, thus retarding leakage around the piston 17 and also frictionally resisting movement between the piston and cylinder. This also prevents trapped pressure fluid in the spaces 37b and 38b from escaping past the piston portion 4.

When the signal energizes one or the other of the electromagnets 44 or 45 the spool valve is shifted to admit pressure into one of the spaces 37b or 38b for moving the piston 2 relative to the cylinder 1. The other space 38a or 37a is vented by the spool valve 17 into the return or low pressure conduit 27 and simultaneously the spool valve 17 vents the conduits 33, 25 to permit the resiliency of the U-shaped metallic piston rings or seals to retract the annular portions 15 thereof, thus permitting free movement between the piston 2 and the cylinder 1.

Referring to FIG. 4 the annular U-shaped piston ring is indicated at 51 having parallel side flanges 52 and a thinner bottom or periphery 53. The annular U-shaped (in cross section) piston ring or seal is seated in an annular channel 54 formed in the periphery of piston 55 and the side flanges may be welded at 56 to the base of the channel, the piston 54 having pressure supply conduits such as the conduit 57, equivalent to conduit 25 in the form shown in FIGS. 1 to 3.

The flexible seal or ring 51 is flexed outwardly like the seals or rings 12, 13, and 14 in a direction normal to the direction of relative cylinder movement, thereby increasing the seal or ring force against the cylinder wall, which, in turn, prevents fluid from passing between the cylinder and the outer surface of the seal called the "face" side, the seal force also increasing the friction force to impede motion between the piston and the cylinder, but in its normal state or shape it would just make contact with the cylinder wall, thus having a minimum friction force as the cylinder moves relative to the piston.

The flexible seals or rings 12, 13, 14, or 51 then change their shape and dimensions as the fluid pressure contained in the hollow sections of the seals is varied. That is, when the fluid presure is zero, or near zero, the seal takes its normal unstrained shape and when the pressure increases the seal flexes and expands, similar in manner to an inflatable rubber tube, however, the seal is metallic to withstand high and low temperature changes. The seal will be required to flex many thousands of times during its operating life, consequently a suitable material such as a mild grade of steel, or steel alloy, having the desired flexibility, resilience and wear qualities should be used. Since the pressure of the seal or ring on the wall of the cylinder is very light or practically zero when the piston and cylinder are moving, and the pressure is heaviest when the piston and cylinder are not moving, the seals should wear longer than conventional ring seals where the outward pressure is always the same or in expandable seals which are relaxed when the piston is at rest and expanded by internal pressure while the piston is in motion.

Since the life of the seals or rings in accordance with the invention should be longer, thus reducing friction and wear, the life or number of cycles for which the flexible resilient metallic seals could operate in comparison with a solid seal would be very great and, therefore, the relibility of the actuating device will be much higher than if conventional seals are used.

Also, since wear is reduced to a minimum, the number of foreign particles generated by wear and friction which, in turn, contaminate the working fluid and clog various small openings in the over-all system is reduced to a minimum, and being a flexible resilient metallic piston ring seal, because of its construction materials, it has the ability to operate over long periods at high fluid and ambient temperature and pressure conditions.

For purposes of exemplification, a particular embodiment of the invention has been shown and described to the best understanding thereof. However, it will be apparent that changes and modifications in the arrangement and construction of the parts thereof may be resorted to without departing from the true spirit and scope of the invention as defined in the accompanying claims.

I claim:

1. In an extensible and retractable fluid pressure operated actuator, a cylinder, a piston member axially movable in said cylinder, an annular resilient radially expandable piston ring in the periphery of said piston in surrounding unexpanded condition in substantially free sliding relation to the inner wall of the cylinder to retard pressure leakage around said piston between the opposite ends of the cylinder during relative movement of said piston by the introduction of pressure fluid into either end of said cylinder, pressure fluid supply means for normally expanding said piston ring outwardly into predetermined frictional and fluid sealing contact with the inner wall of the cylinder when said piston is at rest in said cylinder, to frictionally resist movement of said piston in said cylinder and resist pressure fluid leakage around said piston between the opposite ends of said cylinder when said piston is at rest, common slidable valve means in said piston for selectively admitting pressure fluid into either end of said cylinder for moving said piston and simultaneously venting said piston ring expanding pressure fluid supply means to allow contraction of said resilient piston ring to its normal unexpanded condition to eliminate frictional contact between said piston ring and said cylinder during selective axial movement of said piston in either direction.

2. In a pressure operated axially extensible and contractable power actuator, a cylinder having closed ends, a piston axially movable in said cylinder, a piston rod connected to said piston and extending out of one end of said cylinder, annular resilient metallic radially expansive piston ring means surrounding said piston in normally unexpanded condition in free relative sliding relation to the inner wall of the cylinder for retarding pressure leakage around said piston between the opposite ends of the cylinder, means for introducing a pressure fluid in said piston behind said piston ring means for expanding said piston ring means into tight frictional contact and fluid sealing relation with the inner wall of said cylinder when said piston is at rest relative to said cylinder for resisting relative axial movement of said piston in said cylinder in either direction and preventing fluid leakage between the opposite ends of the cylinder, and selective control means movably carried by said piston for simultaneously selectively admitting a pressure fluid into either end of said cylinder for moving said piston therein and venting said means for introducing pressure fluid under said piston ring, to allow contraction of said piston ring means away from the wall of said cylinder during the movement of said piston in said cylinder.

3. In an axially extensible and retractable fluid pressure operated actuator device comprising a cylinder, a piston member axially movable in said cylinder, pressure fluid operated servo motor valve means in said piston having a null position and selectively movable in said piston in opposite directions from said null position for selectively admitting a pressure fluid into either end of said cylinder for selectively moving said piston axially in said cylinder, annular resilient radially expansive piston ring seal means surrounding the periphery of said piston member having a normal unexpanded condition in substantially free sliding relation to the inner wall of said cylinder to retard pressure fluid leakage around said piston member between the ends of said cylinder and relieve friction between said piston ring seal and said cylinder while said piston member is moving in either direction in said cylinder, and fluid pressure supply means for admitting pressure fluid into said piston for selectively moving said servo motor valve means in either direction from said null position, said servo valve means comprising means for admitting fluid pressure behind said piston ring seal for expanding the same into friction and fluid sealing contact with the wall of the cylinder when said servo valve is in said null position, and venting said pressure from behind said piston ring seal to permit contraction thereof to its unexpanded condition upon movement of said servo motor valve in either direction in said piston from said null position.

4. An axially extensible power actuator comprising a cylinder having an inner wall, a piston member mounted for relative axial movement in said cylinder, said piston having an annular pressure channel in its periphery, an annular U-shaped resilient metallic radially expansible piston ring sealed in said pressure channel having a normal unexpanded condition with its periphery disposed in close free sliding relation to said inner wall to retard the passage of pressure fluid between the opposite ends of the cylinder, servo motor valve means movably mounted in said piston having a null position for admitting a pressure fluid into said pressure chamber behind said piston ring for expansion of the periphery of said ring into tight frictional contact with the said inner wall to resist movement of said piston in said cylinder and prevent fluid leakage around said piston between the opposite ends of said cylinder, said valve means being movable in opposite directions in said piston from said null position for simultaneously venting said pressure channel to vent the fluid pressure therein to permit contraction of said U-shaped piston ring to its unexpanded condition, from friction and fluid sealing contact with said wall and admit pressure fluid into one or the other ends of the cylinder for moving said piston freely in said cylinder to extend or contract said actuator, and remote control means operatively connected to said servo motor valve means for moving said valve means in opposite directions away from and back to said null position.

References Cited by the Examiner

UNITED STATES PATENTS 1,183,213   5/1916   Lewis _____ 91—45

FOREIGN PATENTS 749,695   5/1956   Great Britain.

MARTIN P. SCHWADRON, *Primary Examiner.*

SAMUEL LEVINE, *Examiner.*

P. T. COBRIN, *Assistant Examiner.*